ки
US010607307B1

(12) United States Patent
Pickens et al.

(10) Patent No.: US 10,607,307 B1
(45) Date of Patent: Mar. 31, 2020

(54) COLLECTIVE PURCHASING SYSTEMS AND METHODS FOR CONTROLLED-ENVIRONMENT FACILITY RESIDENTS VIA CONTROLLED-ENVIRONMENT FACILITY RESIDENT COMMUNICATION AND/OR MEDIA DEVICES

(71) Applicant: Securus Technologies, Inc., Carrollton, TX (US)

(72) Inventors: Connor Pickens, Little Elm, TX (US); Alexander Noland, North Richland Hills, TX (US)

(73) Assignee: Securus Technologies, Inc., Carrollton, TX (US)

( * ) Notice: Subject to any disclaimer, the term of this patent is extended or adjusted under 35 U.S.C. 154(b) by 193 days.

(21) Appl. No.: 15/634,216

(22) Filed: Jun. 27, 2017

(51) Int. Cl.
| G06Q 30/00 | (2012.01) |
| G06Q 50/26 | (2012.01) |
| G06Q 30/06 | (2012.01) |
| G06Q 20/26 | (2012.01) |
| G06Q 20/22 | (2012.01) |

(52) U.S. Cl.
CPC ............ G06Q 50/26 (2013.01); G06Q 20/26 (2013.01); G06Q 20/29 (2013.01); G06Q 30/0605 (2013.01)

(58) Field of Classification Search
CPC .... G06Q 50/26; G06Q 30/0605; G06Q 20/26; G06Q 20/29
USPC ................................................ 705/26.1–27.2
See application file for complete search history.

(56) References Cited

U.S. PATENT DOCUMENTS

2013/0332250 A1* 12/2013 Armaly ................ H04N 21/252
705/14.23
2017/0324927 A1* 11/2017 Hodge ............... H04N 21/4882

OTHER PUBLICATIONS

Cohen, Tobi. "From haircut kits to Hunger Games, inmate purchases offer curious peek at prison life in Canada." Canada.com. Sep. 14, 2012. https://o.canada.com/news/0915-inmate-shopping (Year: 2012).*

* cited by examiner

*Primary Examiner* — Jason B Dunham
*Assistant Examiner* — Anand R Loharikar
(74) *Attorney, Agent, or Firm* — Fogarty LLP

(57) ABSTRACT

Systems or methods for collective purchasing by controlled-environment facility residents may employ a plurality of controlled-environment facility resident communication and/or media devices, each associated with a respective controlled-environment facility resident. These devices, disposed within one or more controlled-environment facilities, may each present an interface for purchasing goods and/or services via the device. The devices may each offer, via the interface, an option to collectively purchase a single good or service by a number of controlled-environment facility residents and may accept an indication of partial payment from the resident associated with the device. A controlled-environment facility management system, or similar functionality, may debit the partial payment from a respective controlled-environment facility trust account maintained to the benefit of each controlled-environment facility resident making a partial payment and may provision the collectively purchased good or service to these residents.

21 Claims, 4 Drawing Sheets

COLLECTIVE PURCHASING SYSTEMS AND METHODS FOR CONTROLLED-ENVIRONMENT FACILITY RESIDENTS VIA CONTROLLED-ENVIRONMENT FACILITY RESIDENT COMMUNICATION AND/OR MEDIA DEVICES

TECHNICAL FIELD

The present disclosure relates generally to controlled-environment facilities, more particularly to processing of electronic commissary orders, media orders and the like in controlled-environment facilities, and specifically to distribution of collectively purchased goods and services to a number of controlled-environment facility residents.

BACKGROUND

In a controlled-environment facility, such as within a correctional facility (i.e., a prison or jail), controlling access, information, interaction, and/or transactions is often of particular interest. In a correctional facility in particular, safety and security is of paramount importance and, therefore, the number one job of the personnel thereof is to effectively implement controls with respect to the residents (inmates) thereof. However, such controlled-environment facilities often operate not unlike a small city in which a number of individuals work and live, thus requiring various goods and/or services associated with civilized society. Accordingly, various exchanges of information, money, goods, etcetera, may be performed in association with individuals of a controlled environment, both within the controlled-environment facility and external thereto.

For example, an inmate residing in a correctional facility may wish to communicate with friends and family outside of the prison facility. Likewise, an inmate may wish to acquire commissary items, such as toiletries, bed linens, clothing, and food items. However, facilitating and administrating exchanges of information, money, goods, etcetera, with respect to a controlled environment facility, such in association with each of the foregoing examples, is often costly and time consuming and may even present security and safety issues. For example, often substantial controlled environment facility personnel (e.g., guard) time is expended in scheduling visitations, conducting background checks with respect to visitors, providing information regarding visitation times and rules, etcetera. Likewise, substantial controlled environment facility personnel time is expended in taking orders for commissary items, verifying that individuals have sufficient funds to purchase commissary items, accepting and accounting for funds received from various individuals for the benefit of another individual to purchase commissary, reporting status of accounts and orders, delivering commissary orders, etcetera. Moreover, such personnel may be called upon repeatedly to perform such tasks as respond to balance inquiries, explain account deductions/credits, answering frequently asked questions, and/or the like. The time such controlled environment facility personnel dedicate to such tasks is both costly to the controlled environment facility and removes such personnel from other tasks, such as securing the facility and monitoring the activity of the population.

Moreover, such tasks as accomplished today are typically largely paper based and require appreciable manual processing, thereby further aggravating the directing of personnel's attention away from tasks more primary to the operation of the controlled environment facility and further adding to the costs. For example, appreciable resources are often involved in taking commissary orders, such as to provide updated item and price lists, order forms (e.g., SCANTRON forms), etcetera. Commissary orders are typically delivered by a designated commissary provider, which packages a resident's ordered goods and deliver them to the facility. The personnel that prepare the commissary packages are subject to background checks and are monitored to prevent contraband introduction into the facility in this manner. Prior to distribution, the orders are sorted by housing unit, etc. Accordingly, current processes for facilitating and administering exchanges of information, money, goods, etcetera, with respect to a controlled environment facility involve substantial expenses of consumable resources.

Traditional methods for dissemination of education or entertainment media in controlled-environment facilities have included print libraries, or the like. Traditionally, residents of controlled-environment facilities, particularly controlled-environment facilities such as correctional institutions, are not allowed access to streaming content. Similarly, unrestricted or untethered access to wireless data communication systems is not typically allowed, such as for security reasons. That is to say, traditionally, there are security concerns in a controlled environment facility that result in a need for tightly controlled media. Regardless, the use of tablet computer devices, smartphones, and/or the like, particularly adapted or otherwise approved for use within a controlled-environment facility has recently been adopted in certain facilities. However, the cost of streamed or downloaded data, particularly in the form of media files, data plan limits, and/or the cost of bandwidth to download or stream such files, may still be a concern.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present invention is directed to systems and methods, which provide for collective purchasing by controlled-environment facility residents. Therein, a plurality of controlled-environment facility resident communication and/or media devices may be disposed within one or more controlled-environment facilities. Each resident device may be associated with a respective controlled-environment facility resident and may be configured to present an interface for purchasing goods and/or services via the resident device. Each resident device may also be configured to offer, via the interface, an option to collectively purchase a single good or service by a number of controlled-environment facility residents and may accept an indication of partial payment for the single good or service from the resident associated with the device. The amount of this partial payment is based on the number of residents taking part in the purchase. A controlled-environment facility management system may debit the partial payment from a controlled-environment facility trust account maintained to the benefit of each controlled-environment facility resident that is making a partial payment via a resident device and may see to the provisioning of the collectively purchased good or service to the residents.

The good or service collectively purchased may be some sort of media content, such as a motion picture, television program episode, live streamed (sports or entertainment) event, or the like. The controlled-environment facility management system may provision the media content, at least in part, by directing streaming of the media content to the controlled-environment facility resident communication and/or media device of each controlled-environment facility resident who made a partial payment. To such end, a controlled-environment facility content server may be configured to stream the media content to the resident devices of the residents who made a partial payment, under supervision of the controlled-environment facility management system. Alternatively, the controlled-environment facility management system may provision the media content, at least in part, by directing streaming of the media content from a content provider, to a resident device of each resident who made a partial payment.

In some implementations, each controlled-environment facility resident communication and/or media device may be further configured to accept indication of a partial payment from an additional controlled-environment facility resident for the media content, after streaming of the media content has begun. In this manner, the additional controlled-environment facility resident may join streaming of the media content to the resident device of the additional resident. In such implementations, the controlled-environment facility management system may be further configured to reduce an amount debited, and/or refund a portion of an amount debited, from each controlled-environment facility trust account of each resident making partial payments as a result of the partial payment from the additional resident.

In various embodiments, one or more of the techniques described herein may be performed by one or more computer systems. In other various embodiments, a tangible computer-readable storage medium may have program instructions stored thereon that, upon execution by one or more computer systems, cause the one or more computer systems to execute one or more operations disclosed herein. In yet other various embodiments, one or more systems may each include at least one processor and memory coupled to the processor(s), wherein the memory is configured to store program instructions executable by the processor(s) to cause the system(s) to execute one or more operations disclosed herein.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

Figure 1:
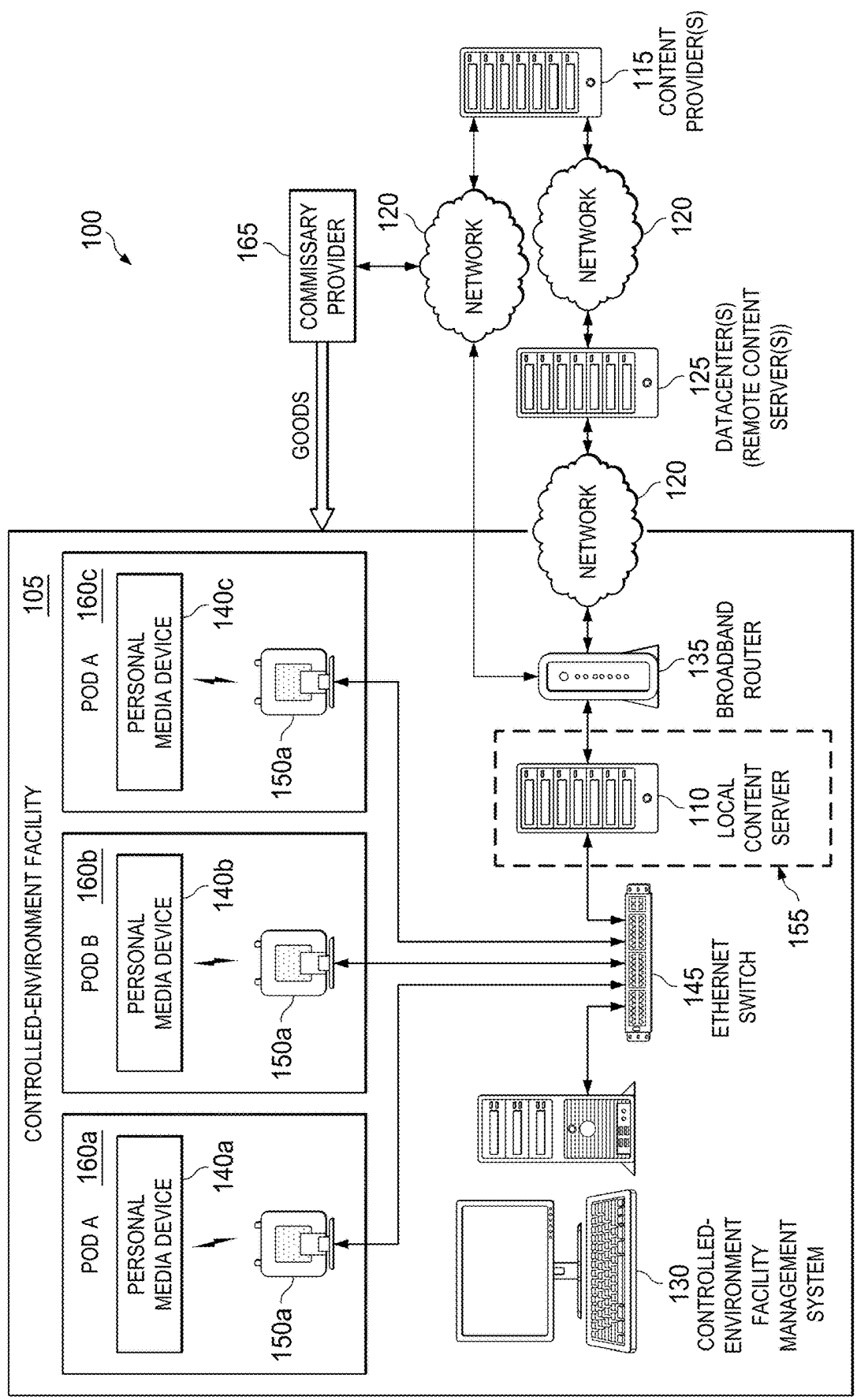
Figure 2:
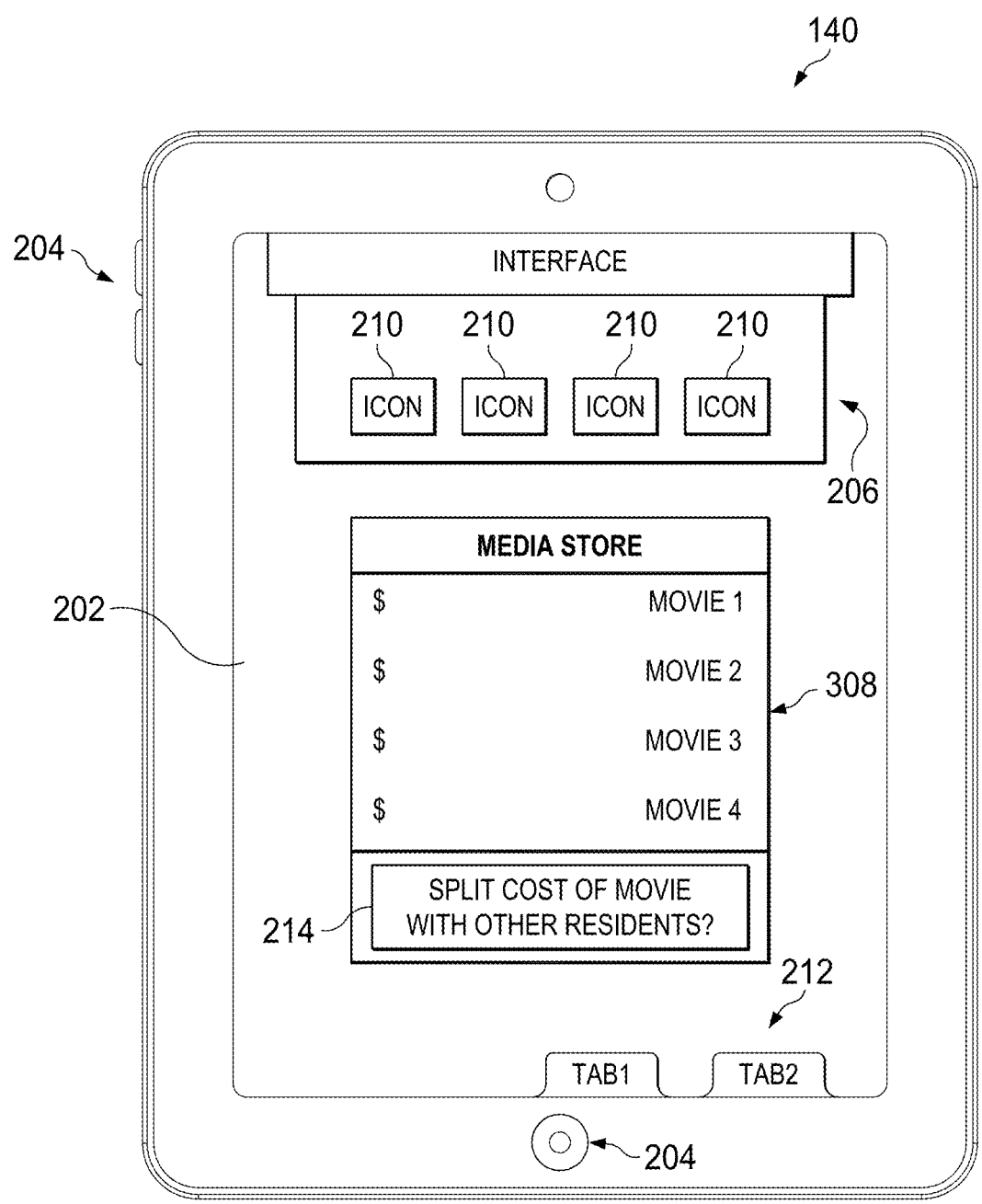
Figure 3:
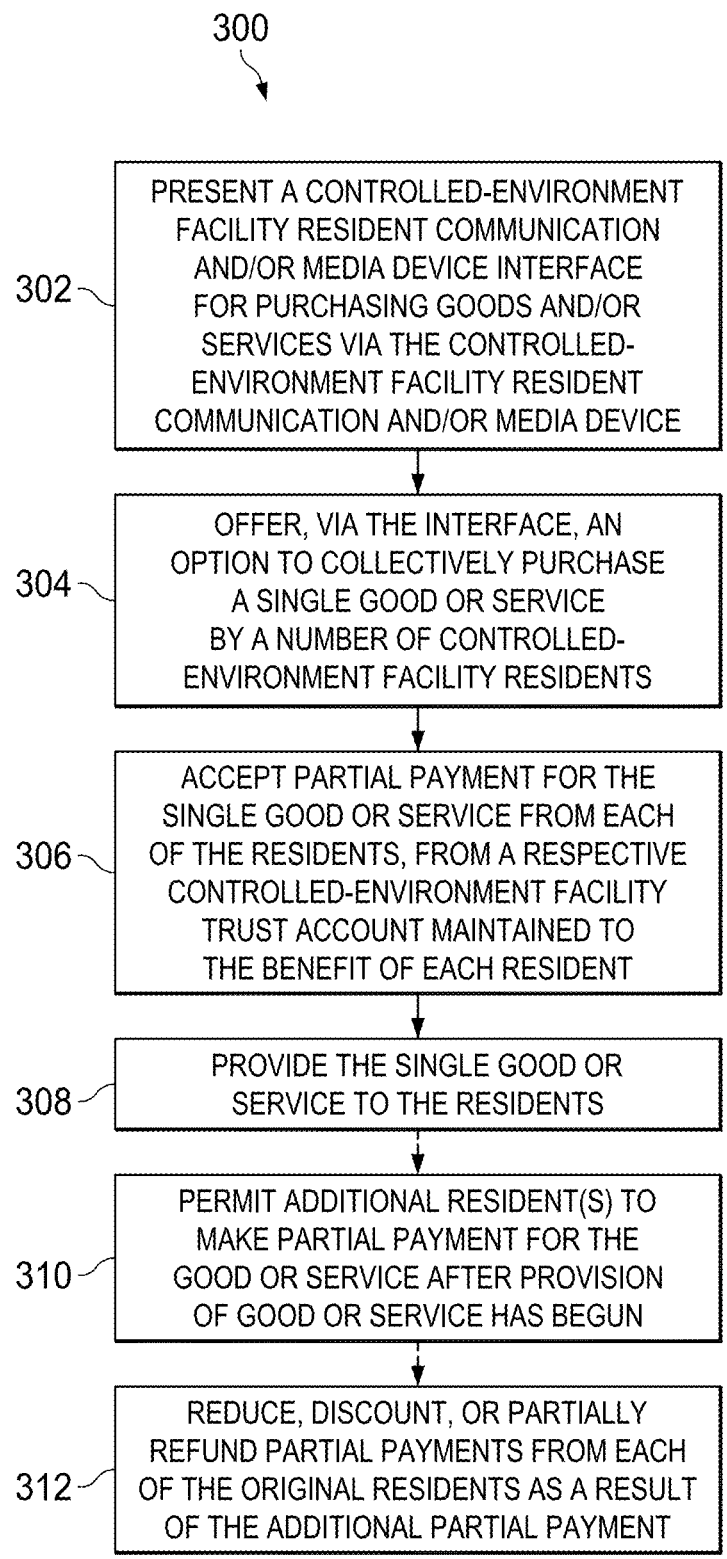
Figure 4:
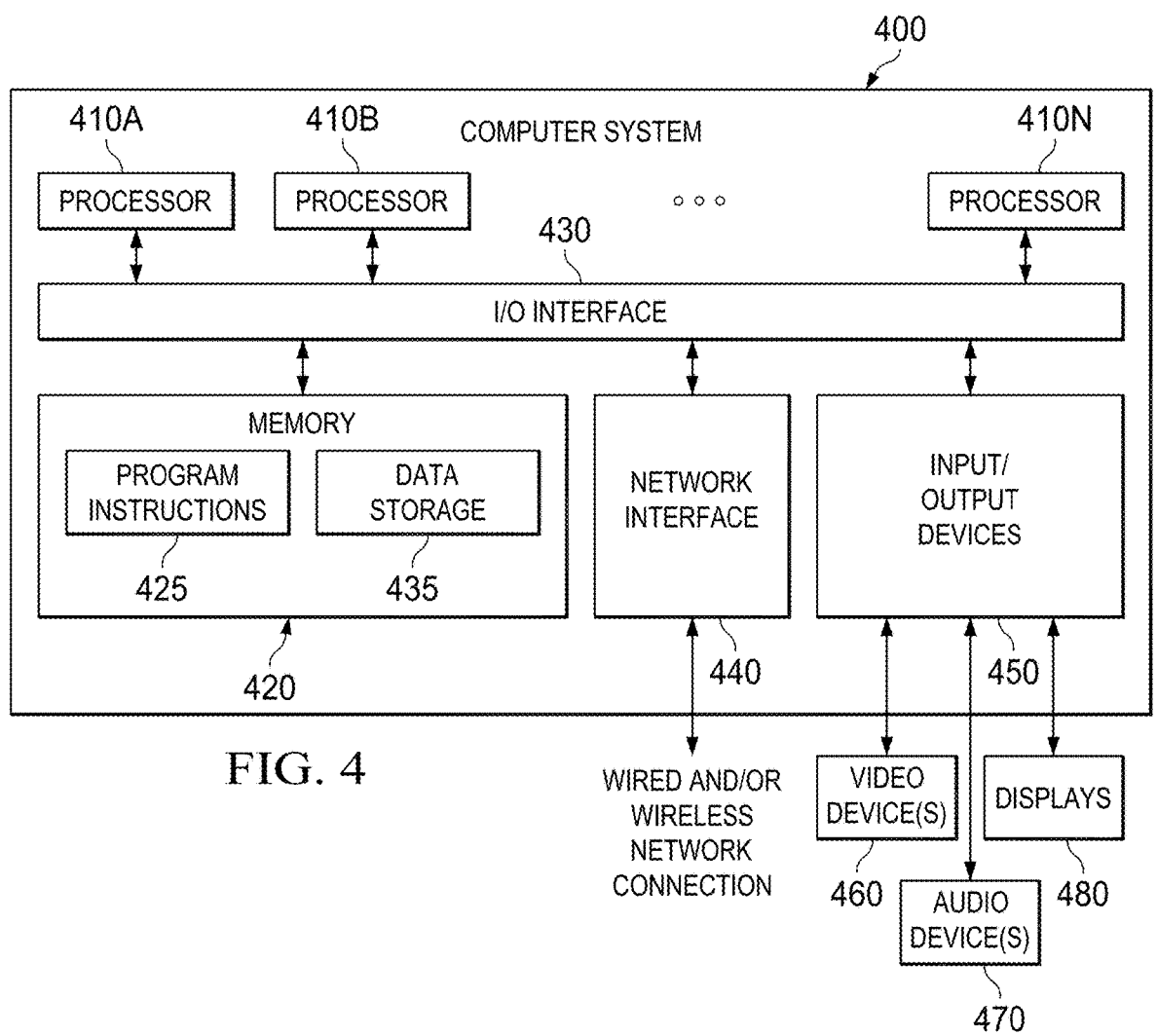

Having thus described the invention in general terms, reference will now be made to the accompanying drawings, which are not necessarily drawn to scale, and wherein:

FIG. 1 is a diagrammatic illustration of an example environment, wherein an example embodiment of the present systems and methods for collective purchasing by controlled-environment facility residents, via controlled-environment facility resident communication and/or media devices, may be deployed, in accordance with some embodiments;

FIG. 2 is a diagrammatic illustration of an example intelligent controlled-environment facility resident communication and/or media device, according to some embodiments of the present systems and methods;

FIG. 3 is a flowchart of an example process implementation for collective purchasing by controlled-environment facility residents, via controlled-environment facility resident communication and/or media devices, in accordance with some embodiments;

FIG. 4 is a block diagram of a computer system, device, station, or terminal configured to implement various techniques disclosed herein, according to some embodiments.

While this specification provides several embodiments and illustrative drawings, a person of ordinary skill in the art will recognize that the present specification is not limited only to the embodiments or drawings described. It should be understood that the drawings and detailed description are not intended to limit the specification to the particular form disclosed, but, on the contrary, the intention is to cover all modifications, equivalents and alternatives falling within the spirit and scope of the claims. As used herein, the word "may" is meant to convey a permissive sense (i.e., meaning "having the potential to"), rather than a mandatory sense (i.e., meaning "must"). Similarly, the words "include," "including," and "includes" mean "including, but not limited to."

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

For example, various types of controlled-environment facilities are present in today's society, and persons may be voluntary or involuntary residents of such facilities, whether temporarily or permanently. Examples of controlled-environment facilities may include correctional institutions (e.g., municipal jails, county jails, state prisons, federal prisons, military stockades, juvenile facilities, detention camps, home incarceration environments, etcetera), healthcare facilities (e.g., hospitals, nursing homes, mental health facilities, rehabilitation facilities, such as drug and alcohol rehabilitation facilities, etcetera), restricted living quarters (e.g., hotels, resorts, camps, dormitories, barracks, etcetera), and the like. For convenience of explanation, various examples discussed herein are presented in the context of correctional facilities, or the like. For instance, in some of the embodiments discussed below, a controlled-environment facility may be referred to as a correctional facility, jail or prison, and its residents may be referred to as inmates, arrestees, or detainees. It should be understood, however, that the systems and methods described herein may be similarly applicable to other types of controlled-environment facilities and their respective residents (e.g., a hospital and its patients, a school dormitory and its students, etcetera).

The present systems and methods for collective purchasing by controlled-environment facility residents, via controlled-environment facility resident communication and/or media devices, relate generally to controlled-environment facilities, more particularly to processing of electronic commissary orders, media orders and the like in controlled-environment facilities, and specifically to distribution of collectively purchased goods and services to a number of controlled-environment facility residents. Embodiments of the present systems and methods for collective purchasing by controlled-environment facility residents may employ a plurality of controlled-environment facility resident communication and/or media devices, each associated with a respective controlled-environment facility resident. These devices, disposed within one, or more, controlled-environment facilities, may each present an interface for purchasing goods and/or services via the device. The devices may each offer, via the interface, an option to collectively purchase a single good or service by a number of controlled-environment facility residents and may accept an indication of partial payment from the resident associated with the device. A controlled-environment facility management system, or similar functionality, may debit the partial payment from a respective controlled-environment facility trust account maintained to the benefit of each controlled-environment facility resident making a partial payment and may provision the collectively purchased good or service to these residents.

Thus, in accordance with embodiments of the present systems and methods, controlled-environment facility residents, such as inmates in a correctional facility, with limited funds, can combine their funds with other residents to purchase or consume a product that they otherwise would not be able to. In accordance with traditional controlled-environment facility commissary systems and the like, a controlled-environment facility resident (inmate) that cannot afford a purchase petitions family and/or friends for more funds to make the purchase. The family and/or friends may or may not provide, or even be able to afford to provide, the requested additional funds. Under embodiments of the present systems and methods, controlled-environment facility resident (inmate) debit account funds (i.e. funds in trust accounts maintained by, or in association with, the controlled-environment facility, to the benefit of each respective resident) are combined to make purchases. Typically, only one controlled-environment facility resident account can be used to make a purchase, where under the present systems and methods for collective controlled-environment facility resident (inmate) purchasing, multiple accounts will be able to come together to make purchases that the individual residents (accounts) might not have been able to afford before. Collective controlled-environment facility resident (inmate) purchasing is a process and resulting system wherein multiple controlled-environment facility residents (inmates) can pool their funds to purchases products. The present systems and methods allow for consideration of residents (inmates) using multiple resident (inmate) devices (i.e. each resident employing their own controlled-environment facility resident communication and/or media device). In accordance with embodiments of the present systems and methods, each resident (inmate) logs into a portal to contribute their desired amount to the pool of funds. Each login may employ security measures to minimize fraud, Personal Identification Number (PIN) theft, and/or the like. In some embodiments, a product to be jointly purchased (such particular media content) can be selected prior to each inmate deciding how much they want to contribute.

FIG. 1 is a diagrammatic illustration of example environment 100, wherein an example embodiment of the present systems and methods for collective purchasing by controlled-environment facility residents, via controlled-environment facility resident communication and/or media devices may be deployed, in accordance with some embodiments. Illustrated environment 100 shows an embodiment of a controlled-environment facility digital media distribution system that includes a controlled-environment facility local content server 110 that stores content from content providers 115. Content providers 115 may provide content such as motion pictures, television episodes, live streamed content (e.g. music events, sporting events, etc.), or the like. An "outward facing" network connection links controlled-environment facility local content server 110 to at least one content provider 115. Data network 120 may include one or more networks, such as the Internet, an intranet, or any other type of data network suitable for allowing transfer of digital media from content service provider 115 to local content server 110 and/or datacenter 125. Datacenter 125 may handle request for media in a manner conforming to requirements of controlled-environment facility 105 (i.e. may apply security and/or controls to the request and delivery of media). Controlled-environment facility 105 may make use of an administrative system, such as illustrated controlled-environment facility management system or functionality 130, such as a Jail Management System (JMS), or the like in correctional institution embodiments. Regardless, controlled-environment facility management system 130 may provide administration over whether a particular resident can request and/or subscribe to content at all, or content of a particular nature, and/or a particular media, or the like. These security and/or control rules may be enforced by local content server 110 (and/or datacenter 125). Local content server 110 may pass the resident request for a particular media on through controlled-environment facility network connectivity, such as broadband router 135 either directly to the media content provider (servers) 115 or through datacenter 125, which, as illustrated, may be external to controlled-environment facility 105. Datacenter 125 may provide the content if the content is hosted in the datacenter, such as in accordance with a license or content subscription agreement. Moreover, datacenter 125 may act as or provide functionality to act as a remote content server, such as in place of, or in addition to, local content server 110, in accordance with some embodiments of the present systems and methods.

In accordance with various embodiments of the present systems and methods, controlled-environment facility management system 130 and controlled-environment facility local content server 110 may be located at, or in, facility 105, as illustrated in FIG. 1. However, either of controlled-environment facility local content server 110 or controlled-environment facility management system 130 may be combined (such as with other facility management systems), and/or located at a central location outside of the facility, disposed in a decentralized manner at several locations, or otherwise located and/or combined so as to receive or provide data communications, in accordance with the present systems and methods. As but one example, controlled-environment facility local content server 110 may be a part of, co-housed with, or co-hosted with, datacenter 125, just as to provide the aforementioned remote content server.

Controlled-environment facility management system 130 may include a database, or the like, hosting information such as balances for resident trust and calling accounts; trial schedule; conviction data; criminal record; sentencing data, such as time served, time remaining to be served, and release date; cell and cellmate assignments; resident restrictions and warnings; commissary order history; telephone call history; call recordings; known or suspected gang or criminal affiliations; known or suspected affiliates, accomplices, or gang members; and any other information that may be relevant or useful to correctional facility staff to house and maintain residents. Controlled-environment facility management system 130 may provide controlled-environment facility resident account management, or a separate controlled-environment facility resident account management system may be employed, to maintain resident accounts for the benefit of the respective resident, such as resident commissary accounts, resident communications accounts, which may be used to pay for communications, such as phone calls, video visitation, internet chats, emails, text messages, or the like, etc.

Inward facing connectivity from and to controlled-environment facility local content server 110 extends from and to controlled-environment facility resident communication and/or media devices 140a-140c, such as via Ethernet switch 145 and wireless access points 150a-c. The controlled-environment facility resident communication and/or media devices 140 may be tablet computing devices adapted and/or approved for use by residents of controlled-environment facility 105 (within controlled-environment facility 105), as discussed in greater detail below. Local content server 110, which may be referred to as a local platform, or the like, may provide content caching, such as the aforementioned storing of media, or the like. Such caching can promote balanced streaming and/or downloading of content to resident/inmate tablet devices 140a-c and/or provide for downloading, as resident/inmate tablet device access to Wi-Fi coverage allows and/or when a resident/inmate tablet device is interfaced with a communications kiosk, specially adapted video phone and/or the like.

Content may also be provided directly from content provider(s) 115, or the like, to inward facing network connectivity for provision to controlled-environment facility resident communication and/or media devices 140, in accordance with embodiments of the present systems and methods, in effect bypassing local content server 110, or in implementations where a local content server is not employed. In such embodiments, content streamed directly from content provider(s) 115, or the like may be streamed under the direction and control of controlled-environment facility administrative system 130, local content server 110 (if present), datacenter 125, or the like.

Controlled-environment facility management system 130 may determine whether a particular resident is allowed access to requested content. Alternatively, or additionally, the controlled-environment facility local content server may determine whether the resident is allowed access to the content and streams the content to the resident media device in response to a determination that the resident is allowed access to the content. To this end, the controlled-environment facility local content server may access controlled-environment facility management system 130 to determine whether the resident is allowed access to the content. Further controlled-environment facility resident media and/or communications devices 140 may themselves determine whether the resident associated with the device is allowed access to the content, which may similarly access controlled-environment facility management system 130 to determine whether the resident is allowed access to the content. Hence, security and other controls of provisioning of the digital media to a (particular) resident can be implemented at the time of distribution of the digital media to the resident, within the controlled-environment facility. In this manner, latest restrictions, or the like, imposed on a resident can be enforced with respect to the resident. Additionally, or alternatively, security and other controls of provisioning of the digital media to a (particular) resident can be implemented at the time of download and/or storage to local content server 110.

Media downloaded to local content server 110 and then distribution to residents may be licensed for such use or distribution. For example, local content server 110 may merely act as a pass-through for content licensed to a particular controlled-environment facility resident. In such embodiments or situations, the local content server may not retain a copy of the particular licensed copy of the content. In other embodiments, local content server 110 may host copies of various media for distribution as appropriate under a licensing agreement, or the like.

Further, controlled-environment facility local content server 110 may be isolated by firewall 155, and/or otherwise act as a firewall, such as to afford an ability to quarantine and examine incoming digital media files, and and/or to ensure control over access to the digital media files until the determination as to whether the intended resident recipient is allowed access to this content. For example, some downloaded content could include malware, rogue content information, or the like, which would not be approved by the content server. Access to such content may be denied, or the content may otherwise be made appropriate for downloading or steaming to the intended resident. For example, embedded inappropriate hyperlinks may be redirected via appropriate DNS redirection security measures.

As noted, communications to or from resident devices is carried out via local network connectivity such as an Ethernet switch 145 and wireless access points 150a-150c. Communications kiosk, specially adapted videophone and/or the like, may act as wireless and/or wired access points 150a-c for resident/inmate tablet devices 140a-c. Alternatively, or additionally, access points may be dedicated wired or wireless access points, such as a Wi-Fi router or the like. Hence, the internal controlled-environment facility connectivity may include Wi-Fi connectivity, and in such embodiments a local area network employing the Wi-Fi connectivity includes wireless access points 150a-c, each disposed in corresponding portion 160a-c of the controlled-environment facility to provide access by controlled-environment facility resident communication and/or media devices disposed in that portion of the controlled-environment facility. For example, where the controlled-environment facility is a correctional facility, the portion of the correctional facility may be a cellblock, pod or common area, such as laundry room, the yard (outside) dayroom cafeteria, exercise facilities or the like. So, in a correctional facility embodiment, a local area network employing the Wi-Fi connectivity may employ wireless access point 150a disposed in pod 160a of correctional facility 105 to provide access by inmate media device 140a, also disposed in pod 160a. Due to the nature of the construction (e.g., steel, steel-reinforced concrete, or the like) and/or layout (e.g. radiating pod structure, or the like) of a correctional facility, coverage from a particular wireless access point (150a), should be contained to the pod (160a) in which it is installed, and hence only reach resident devices (140a) located in that pod (160a), and be more-or-less isolated from devices (140b and 140c) in other pods (160b and 160c).

Streaming and/or downloading may be further compartmentalized by taking advantage of, or employing, antenna directionality of wireless access points 150a-c, signal strength, and/or the like. For example, an authorized transceiver power level may be determined for communicating with the user interface device in response to a request. Additionally, such a system or method may dynamically set a transceiver power in response to the determination. As a further example, a secure network access point may include one or more antennas used for wirelessly communicating with a user interface device, such as the aforementioned resident devices. The one or more antennas may be configured to communicate using a dynamically settable power level. For example, the antenna may be configured to communicate within a first range at a first power level, within a second range at a second power level, and at a third range at a third power level. In addition, the antenna and/or associated RF equipment may be shut off or filtered to terminate communications between the secure network access point and the user interface device. The antenna may be an omnidirectional antenna, a directional antenna, a beam-forming antenna, etc. In some embodiments, the first communication range may be within a few feet of a secure network access point, or even a few inches, requiring the resident to go to a more-or-less or very specific location, such as a communications kiosk, resident phone, classroom, etc. to download and/or stream content. Further security measures may call for determining an authorized duration of network access for the user interface device. Additionally, the method may include establishing a temporary network access session between the user interface device and the network for the authorized duration of network access, and/or temporary access key for network access.

As noted, the controlled-environment facility resident communication and/or media devices 140a-c may be tablet computing devices, smartphones, or the like, adapted and/or approved for use by residents of the controlled-environment facility (within the controlled-environment facility). controlled-environment facility resident communication and/or media device 140 may be particularly adapted for use in a controlled-environment. For example, in a correctional institution, jail, or the like, such a tablet computing device may have a specially adapted operating system and/or may be "stripped-down," particularly from the standpoint of what applications programs (apps) and/or hardware are provided or allowed on tablet computing device 140, and/or connectivity afforded such a tablet computing device. For example, such a resident computing device may employ an operating system kernel such as one based upon an open source platform such as the CyanogenMod™-based operating system, which may be rebuilt for use in such a tablet computing device in a controlled-environment facility. As a further example, the tablet computing device may be adapted to only connect to a network provided by the controlled-environment facility, and/or in only certain locations, within the controlled-environment facility, such as may be controlled by availability of Wi-Fi access, or the like, only being available in certain areas, as discussed above. That is, for example, where streaming and/or downloading may be compartmentalized, leveraging the structure of the controlled-environment facility for example limiting the availability of a Wi-Fi signal providing the stream through the placement of wireless access points, antenna directionality of such wireless access points, and/or the like. Further, controlled-environment facility resident communication and/or media devices 140 may allow access to apps or content only upon application of security measures, by the device. Such security measures may include determining, by the controlled-environment facility resident communication and/or media device, DNS spoofing, DNS redirection, use of proxy servers for privacy and security, biometric validation, password validation, and/or the like. Also, the resident devices may have a few fixed apps pre-installed on the device, and installation of further apps on the device may be forbidden (i.e. prevented by modifications to the device's operating system, or the like) and/or restricted, such as by requiring permission from a facility administrator, or the like. Apps provided on resident devices might include apps of particular interest to residents of the controlled-environment facility. For example, tablet computing devices provided to inmates of correctional facilities, might include apps that may be of particular use to an inmate, in general, such as access to a legal research service, or of more specific interest, such as providing an inmate nearing release, access to employment searching apps or the like. Hence, such inmate tablet computing devices may be used to help soon to be released inmates transition. For example, the tablet may be used to communicate with a future employer, or the like. As such, tablets may be sponsored, or otherwise subsidized by organizations or companies, assisting with the transition of inmates into society.

In accordance with embodiments of the present systems and methods, controlled-environment facility resident communication and/or media devices 140 may be used to place commissary orders, media orders or the like. That is, a controlled-environment facility resident communication and/or media device can be used as a point of sale for commissary, media content, or the like.

Commissary provider/vendor 165 may supply commissary goods to residents of controlled-environment facility 105, such as, in accordance with the present systems and methods. Communication out of facility 105 may be directed to commissary provider/vendor 165 in the form of collective resident orders made via controlled-environment facility resident communication and/or media devices 140a-c.

FIG. 2 is a diagrammatic illustration of example intelligent controlled-environment facility resident communication and/or media device 140, according to some embodiments of the present systems and methods. Controlled-environment facility resident communication and/or media device 140 includes screen 202 and one or more hardware buttons 204. Interface 206 may provide access to a number of apps such as a media ordering (store) app 208 shown open in FIG. 2. For example, apps available for use by a resident of the controlled-environment facility who is operating the controlled-environment communication and/or media device may be presented via the controlled-environment facility resident interface 206, such as via icons 210. Alternatively, or additionally, commissary ordering, media ordering, or the like, such as provided in accordance with embodiments of the present systems and methods, may be incorporated into interface 206 itself. One or more tabs 212 may be displayed in interface 206 indicating open apps. In accordance with embodiments of the present systems and methods and as discussed in greater detail below, a resident may place an order on controlled-environment facility resident communication and/or media device 140, such as through media app 208, a commissary app, or the like, and a desire to share the cost of the purchase, as a collaborative purchase in accordance with embodiments of the present systems and methods, may be indicated by an ordering resident by clicking selection 214.

FIG. 3 is a flowchart of example process implementation 300 for collective purchasing by controlled-environment facility residents, via controlled-environment facility resident communication and/or media devices, in accordance with some embodiments. Therein, at 302, an interface is provided for presentation on controlled-environment facility resident communication and/or media devices for purchasing goods and/or services via the devices. The interface may offer an option, at 304, for purchasing a single good or service, collectively, by a number of controlled-environment facility residents. The goods or services offered for collective purchase may be goods or services particularly well suited for such purchase, such as a bulk purchase item (e.g. a large quantity of snack size portions of candy, chips or the like), media content (e.g. a motion picture, one or more television program episodes, live-streamed entertainment or sporting events, or the like), etc.

A partial payment, from a respective controlled-environment facility trust account maintained to the benefit of each resident, may be accepted at 306, for the single good or service, from each of the controlled-environment facility residents. The partial payment called-for, or otherwise required, at 304 and/or 306 from each resident may be based, at least in part on the number of residents taking part in the purchase. However, the total of partial payments may be more than the typical purchase price of the single good or service alone. This may be in order to cover additional administrative costs for accepting and processing the partial payments from multiple residents and/or to cover costs of distributing the good or service (such as media content) to more than one resident (e.g. media content delivered to more than one controlled-environment facility resident communication and/or media device).

At 308, the single good or service may be provided or otherwise provisioned to these residents. Where the collectively purchased good or service is media content (e.g. a motion picture, one or more television program episodes, streamed live sporting or entertainment events, or the like), the media content may be provided by streaming the media content to controlled-environment facility resident communication and/or media devices of the residents. Such media content may be streamed from a controlled-environment facility content server, or may be streamed (more-or-less directly) from a content provider, such as under supervision of a controlled-environment facility management system.

In accordance with some embodiments of the present systems and methods, even after streaming of content has commenced at 308, additional (i.e. further) controlled-environment facility resident(s) may be permitted to join in the collective purchase (and hence the streaming of the content). For example, at 310 the additional resident(s) may be permitted to make a (further or additional) partial payment after provision of the good or service has begun, such as for the media content after streaming of the media content has begun at 308. Thereby, the additional resident(s) may join streaming of the media content to a controlled-environment facility resident communication and/or media device of this (these) additional resident(s), for example. This partial payment by the additional or further resident(s), at 310, may reduce or otherwise discount, or result in a partial refund of, the partial payments from each of the original controlled-environment facility residents taking part in the collective purchase at 312. Still, the total of partial payments may be more than the typical purchase price of the media content alone. This may be in order to cover additional administrative costs for accepting and processing the further partial payment(s) from the additional resident(s) and/or to cover costs of distributing the media content to additional resident device(s).

Hence, applying process implementation 300 for collective purchasing, via controlled-environment facility resident communication and/or media devices 140, to environment 100, a system for collective purchasing by controlled-environment facility residents may include a plurality of controlled-environment facility resident communication and/or media devices 140 such as illustrated in FIGS. 1 and 2. Each of devices 140 may be associated with (e.g. assigned to, purchased by, registered in the name of, etc.) a respective controlled-environment facility resident. Devices 140 are, in accordance with embodiments of the present systems and methods, disposed within one or more controlled-environment facilities (e.g. facility 105, and/or similar facilities). Each controlled-environment facility resident communication and/or media device 140 may present interface 206, at 302, under which an app (e.g. media app 208) for purchasing goods and/or services, via the controlled-environment facility resident communication and/or media device, may be running. This app, or the like, may offer, at 304, via interface 206, an option to collectively purchase a single good or service by a number of controlled-environment facility residents. Controlled-environment facility resident communication and/or media devices 140 may accept at 306 an indication of partial payment for the single good or service from the controlled-environment facility resident associated with the controlled-environment facility resident communication and/or media device, at 306.

Controlled-environment facility management system 130, local content server 110, or the like may debit the partial payment at 306 from a controlled-environment facility trust account maintained (by controlled-environment facility management system 130) to the benefit of each controlled-environment facility resident for the partial payments. At 308 the controlled-environment facility management system 130 provisions the single good or service to the residents, in accordance with embodiments of the present systems and methods.

As noted, the amount of the partial payment may be based on the number of residents taking part in the purchase. However, the total of partial payments may be more than the typical purchase price of the single good or service alone to cover additional administrative costs for accepting and processing the partial payments and/or to cover costs of distributing media content, or other goods or services to more than one resident (device).

Such as discussed, when the good or service is media content (such as a motion picture, television episode(s), live streamed sporting or entertainment events, or the like), controlled-environment facility management system 130, or the like, may provision the media content, at 308, at least in part, by directing streaming of the media content to a controlled-environment facility resident communication and/or media device of each controlled-environment facility resident who made a partial payment. This directing streaming of content may call for controlled-environment facility content server 110, datacenter 125, or the like streaming the media content to the controlled-environment facility resident communication and/or media devices (under supervision of controlled-environment facility management system 130). Alternatively, directing streaming of content may call for streaming the media content (more-or-less) directly from content provider 115, to resident devices 140, under supervision of controlled-environment facility management system 130.

Each controlled-environment facility resident communication and/or media device 140 may also, in accordance with some embodiments of the present systems and methods accept an indication of a partial payment for media content from at least one additional controlled-environment facility resident, at 310, after streaming of the media content has begun at 308, for the additional resident(s) to join (the purchase) streaming of the media content to their device(s). In such embodiments, controlled-environment facility management system 130, or similar functionality may, at 312, reduce an amount debited, and/or refund a portion of an amount debited, from each controlled-environment facility trust account of each of the original collective purchasers as a result of the partial payment from the additional resident(s).

Various elements of the present systems and methods for collective purchasing by controlled-environment facility residents via controlled-environment facility resident communication and/or media devices may be implemented as modules. Modules may be implemented in hardware. In another embodiment, modules may be expressed in software executed by hardware. In still another embodiment, modules may be implemented in firmware operated by hardware. In still other embodiments, modules may be implemented in combinations of hardware, software, and/or firmware.

FIG. 4 is a block diagram of a computer system, device, station, or terminal configured to implement various techniques disclosed herein, according to some embodiments. Embodiments of the present collective purchasing systems and methods for controlled-environment facility residents via controlled-environment facility resident communication and/or media devices, as described herein, may be implemented or executed, at least in part, by one or more computer systems. One such computer system is illustrated in FIG. 4. In various embodiments, computer system 400 may be a server, a mainframe computer system, a workstation, a network computer, a desktop computer, a laptop, a tablet computing device, media player, or the like. For example, in some cases, computer 400 may implement one or more steps of example process implementation 300 described above with respect to FIG. 3, and/or a computer system such as computer system 400 may be used as, or as part of, one or more of local content server 110, datacenter 125, controlled-environment facility management system 130, controlled-environment facility resident communication and/or media devices 140a-140c, etc. In various embodiments two or more of these computer systems may be configured to communicate with each other in any suitable way, such as, for example, via a network (e.g., in FIG. 1, devices and systems 110, 115, 125, 130 and 140a-140c are illustrated as communicating via network 120.

As illustrated, example computer system 400 includes one or more processors 410 coupled to a system memory 420 via an input/output (I/O) interface 430. Example computer system 400 further includes a network interface 440 coupled to I/O interface 430, and one or more input/output devices 450, such as video device(s) 460 (e.g., a camera), audio device(s) 470 (e.g., a microphone and/or a speaker), and display(s) 480. Computer system 400 may also include a cursor control device (e.g., a mouse or touchpad), a keyboard, etcetera. Multiple input/output devices 450 may be present in computer system 400 or may be distributed on various nodes of computer system 400. In some embodiments, similar input/output devices may be separate from computer system 400 and may interact with one or more nodes of computer system 400 through a wired or wireless connection, such as over network interface 440.

In various embodiments, computer system 400 may be a single-processor system including one processor 410, or a multi-processor system including two or more processors 410 (e.g., two, four, eight, or another suitable number). Processors 410 may be any processor capable of executing program instructions. For example, in various embodiments, processors 410 may be general-purpose or embedded processors implementing any of a variety of instruction set architectures (ISAs), such as the x86, POWERPC®, ARM®, SPARC®, or MIPS® ISAs, or any other suitable ISA. In multi-processor systems, each of processors 410 may commonly, but not necessarily, implement the same ISA. Also, in some embodiments, at least one processor 410 may be a graphics processing unit (GPU) or other dedicated graphics-rendering device.

System memory 420 may be configured to store program instructions and/or data accessible by processor 410. In various embodiments, system memory 420 may be implemented using any suitable memory technology, such as static random access memory (SRAM), synchronous dynamic RAM (SDRAM), nonvolatile/Flash-type memory, or any other type of memory. As illustrated, program instructions and data implementing certain operations, such as, for example, those described in connection with FIGS. 1 through 5, above, may be stored within system memory 420 as program instructions 425 and data storage 435, respectively. In other embodiments, program instructions and/or data may be received, sent or stored upon different types of computer-accessible media or on similar media separate from system memory 420 or computer system 400. Generally speaking, a computer-readable medium may include any tangible or non-transitory storage media or memory media such as magnetic or optical media—e.g., disk or CD/DVD-ROM coupled to computer system 400 via I/O interface 430, Flash memory, random access memory (RAM), etcetera. Program instructions and data stored on a tangible computer-accessible medium in non-transitory form may further be transmitted by transmission media or signals such as electrical, electromagnetic, or digital signals, which may be conveyed via a communication medium such as a network and/or a wireless link, such as may be implemented via network interface 440.

In some embodiments, I/O interface 430 may be configured to coordinate I/O traffic between processor 410, system memory 420, and any peripheral devices in the device, including network interface 440 or other peripheral interfaces, such as input/output devices 450. In some embodiments, I/O interface 430 may perform any suitable protocol, timing or other data transformations to convert data signals from one component (e.g., system memory 420) into a format usable by another component (e.g., processor 410). In some embodiments, I/O interface 430 may include support for devices attached through various types of peripheral buses, such as a variant of the Peripheral Component Interconnect (PCI) bus standard or the Universal Serial Bus (USB) standard, for example. In some embodiments, the function of I/O interface 430 may be split into two or more separate components, such as a north bridge and a south bridge, for example. In addition, in some embodiments, some or all of the functionality of I/O interface 430, such as an interface to system memory 420, may be incorporated into processor 410.

Network interface 440 may be configured to allow data to be exchanged between computer system 400 and other devices attached to a network, such as other computer systems, or between nodes of computer system 400. In various embodiments, network interface 440 may support communication via wired or wireless general data networks, such as any suitable type of Ethernet network, for example; via telecommunications/telephony networks such as analog voice networks or digital fiber communications networks; via storage area networks such as Fiber Channel SANs, or via any other suitable type of network and/or protocol.

As shown in FIG. 4, memory 420 may include program instructions 425, configured to implement certain embodiments described herein, and data storage 435, comprising various data accessible by program instructions 425. In an embodiment, program instructions 425 may include software elements corresponding to one or more of the various embodiments illustrated in the above figures. For example, program instructions 425 may be implemented in various embodiments using any desired programming language, scripting language, or combination of programming languages and/or scripting languages (e.g., C, C++, C#, JAVA®, JAVASCRIPT®, PERL®, etcetera). Data storage 435 may include data that may be used in these embodiments. In other embodiments, other or different software elements and data may be included.

A person of ordinary skill in the art will appreciate that computer system 400 is merely illustrative and is not intended to limit the scope of the disclosure described herein. In particular, the computer system and devices may include any combination of hardware or software that can perform the indicated operations. Additionally, the operations performed by the illustrated components may, in some embodiments, be performed by fewer components or distributed across additional components. Similarly, in other embodiments, the operations of some of the illustrated components may not be provided and/or other additional operations may be available. Accordingly, systems and methods described herein may be implemented or executed with other computer system configurations.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for collective purchasing by controlled-environment facility residents comprising:
   a plurality of controlled-environment facility resident communication and/or media devices disposed within one or more controlled-environment facilities, each controlled-environment facility resident communication and/or media device associated with a respective controlled-environment facility resident and configured to:
      present an interface on the controlled-environment facility resident communication and/or media device for purchasing goods and/or services via the controlled-environment facility resident communication and/or media device;
      offer, via the interface, an option to collectively purchase a single good or service by a number of controlled-environment facility residents; and
      accept an indication of partial payment for the single good or service from the controlled-environment facility resident associated with the controlled-environment facility resident communication and/or media device; and
   a controlled-environment facility management system configured to:
      discount the partial payments of each controlled-environment facility resident making a partial payment via a controlled-environment facility resident communication and/or media device associated with the resident a same amount based on number of controlled-environment facility residents making a partial payment via a controlled-environment facility resident communication and/or media device associated with the resident;
      debit the partial payment from a controlled-environment facility trust account maintained to the benefit of each controlled-environment facility resident making a partial payment via a controlled-environment facility resident communication and/or media device associated with the resident; and
      provision the single good or service to the residents.

2. The system of claim 1, wherein an amount of the partial payment is based on the number of residents taking part in the purchase.

3. The system of claim 1, wherein the good or service is media content.

4. The system of claim 3, wherein the media content is a motion picture.

5. The system of claim 3, wherein the media content is a live streamed event.

6. The system of claim 3, wherein the controlled-environment facility management system provisions the media content, at least in part, by directing streaming of the media content to a controlled-environment facility resident communication and/or media device of each controlled-environment facility resident who made a partial payment.

7. The system of claim 6, wherein the system further comprises a controlled-environment facility content server configured to stream the media content to the controlled-environment facility resident communication and/or media devices of the controlled-environment facility residents who made a partial payment, under supervision of the controlled-environment facility management system.

8. The system of claim 6, wherein the controlled-environment facility management system provisions the media content, at least in part, by directing streaming of the media content from a content provider, to a controlled-environment facility resident communication and/or media device of each controlled-environment facility resident who made a partial payment.

9. The system of claim 6, wherein each controlled-environment facility resident communication and/or media device is further configured to accept indication of a partial payment from an additional controlled-environment facility resident for the media content after streaming of the media content has begun for the additional controlled-environment facility resident to join streaming of the media content to a controlled-environment facility resident communication and/or media device of the additional resident.

10. The system of claim 9, wherein the controlled-environment facility management system is further configured to reduce an amount debited, and/or refund a portion of an amount debited, from each controlled-environment facility trust account of each controlled-environment facility resident making partial payments from each of the number of controlled-environment facility residents as a result of the partial payment from the additional controlled-environment facility resident.

11. A method for collective purchasing by controlled-environment facility residents, via controlled-environment facility resident communication and/or media devices, the method comprising:
  presenting an interface on controlled-environment facility resident communication and/or media devices for purchasing goods and/or services via the controlled-environment facility resident communication and/or media devices;
  offering, via the interface, an option to collectively purchase a single good or service by a number of controlled-environment facility residents;
  discounting partial payments of each controlled-environment facility resident making a partial payment via a controlled-environment facility resident communication and/or media device associated with the resident for the single good or service a same amount based on number of controlled-environment facility residents making partial payment via a controlled-environment facility resident communication and/or media device associated with the resident;
  accepting, via the interface, partial payment for the single good or service from each of the number of controlled-environment facility residents, from a respective controlled-environment facility trust account maintained to the benefit of each resident; and
  providing the single good or service to the residents.

12. The method of claim 11, wherein the partial payment is based on the number of residents taking part in the purchase.

13. The method of claim 11, wherein the good or service is media content.

14. The method of claim 13, wherein the media content is a motion picture or television program episode.

15. The method of claim 13, wherein the media content is a live streamed event.

16. The method of claim 13, wherein providing the media content comprises at least streaming the media content to controlled-environment facility resident communication and/or media devices of the residents.

17. The method of claim 16, wherein the media content is streamed from a controlled-environment facility content server.

18. The method of claim 16, wherein the media is streamed from a content provider, under supervision of a controlled-environment facility management system.

19. The method of claim 16, further comprising permitting an additional controlled-environment facility resident to make a partial payment for the media content after streaming of the media content has begun for the additional controlled-environment facility resident to join streaming of the media content to a controlled-environment facility resident communication and/or media device of the additional resident.

20. The method of claim 19 wherein the partial payments from each of the number of controlled-environment facility residents is reduced, discounted, or partially refunded as a result of the partial payment from the additional controlled-environment facility resident.

21. A non-transitory computer-readable storage medium having program instructions stored thereon that, upon execution by one or more controlled-environment facility computer systems, cause the one or more controlled-environment facility computer systems to:
  present an interface on controlled-environment facility resident communication and/or media devices for purchasing goods and/or services via the controlled-environment facility resident communication and/or media devices;
  offer, via the interface, an option to collectively purchase a single good or service by a number of controlled-environment facility residents;
  discount partial payments of each controlled-environment facility resident making a partial payment via a controlled-environment facility resident communication and/or media device associated with the resident a same amount based on number of controlled-environment facility residents making a partial payment via a controlled-environment facility resident communication and/or media device associated with the resident;
  accept, via the interface, partial payment for the single good or service from each of the number of controlled-environment facility residents, from a respective controlled-environment facility trust account maintained to the benefit of each resident; and
  provide the single good or service to the residents.

* * * * *